Oct. 12, 1948.  F. T. MAY ET AL  2,451,169
WIRE WINDING AND WELDING DEVICE
Filed Dec. 23, 1943  2 Sheets-Sheet 1
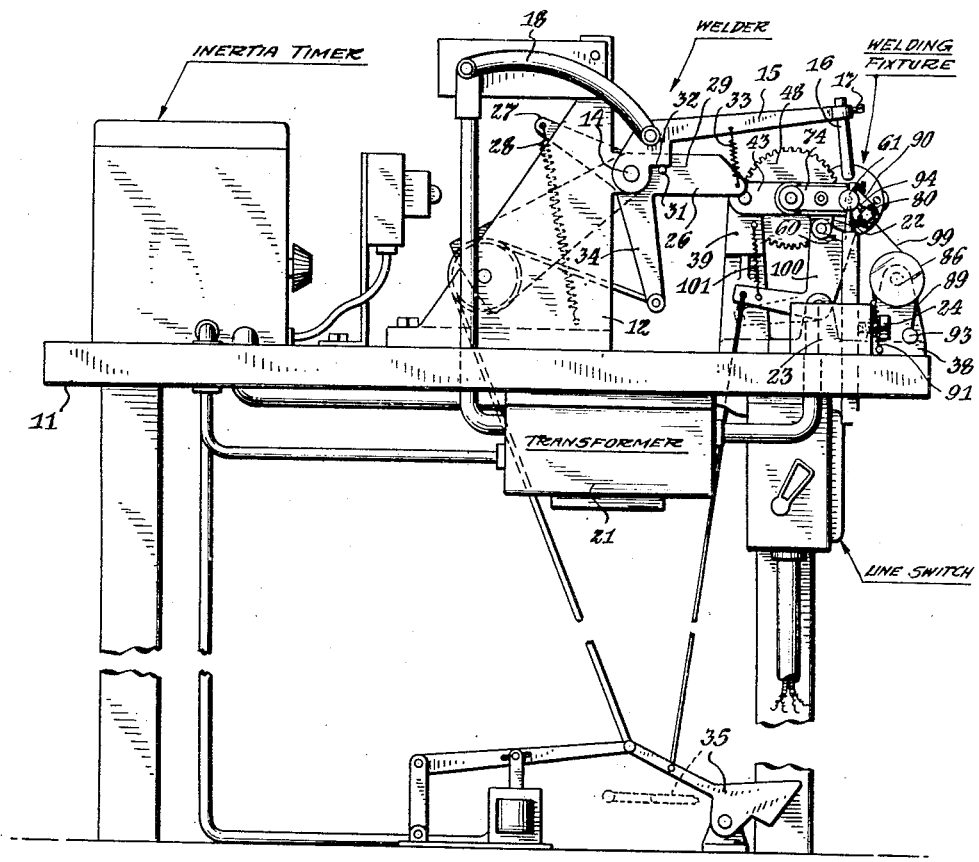
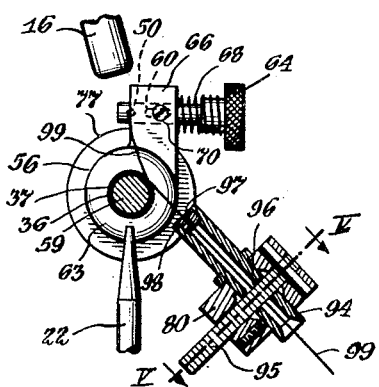
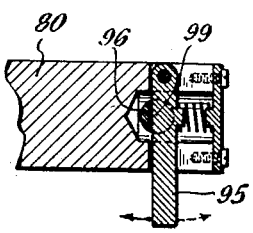
INVENTORS
F. T. MAY
R. A. REHBERG
BY
ATTORNEY

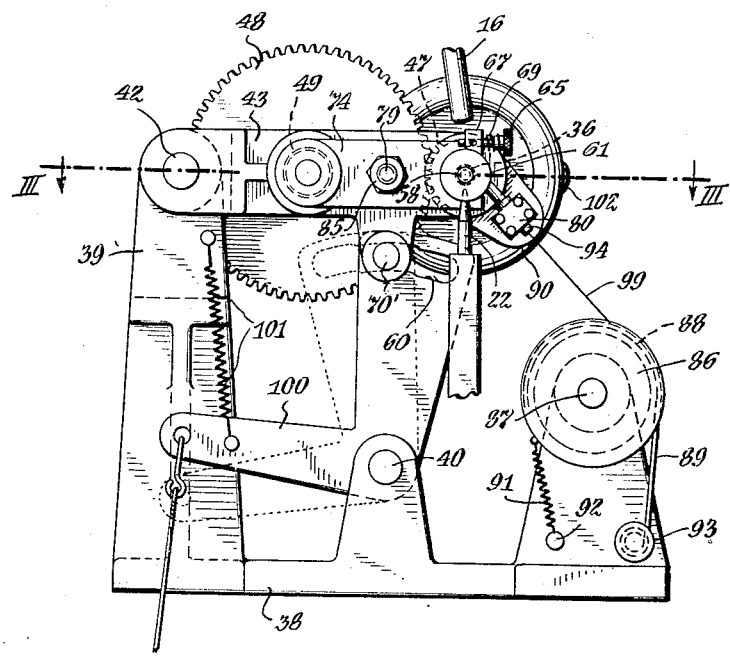

Patented Oct. 12, 1948

2,451,169

UNITED STATES PATENT OFFICE 2,451,169

WIRE WINDING AND WELDING DEVICE

Frederick T. May, Verona, and Richard A. Rehberg, Livingston, N. J., assignors to Westinghouse Electric Corporation, East Pittsburgh, Pa., a corporation of Pennsylvania Application December 23, 1943, Serial No. 515,342

15 Claims. (Cl. 219—4)

This invention relates to the winding of wire and, more particularly, to a means and method for winding wire on, and welding the ends thereof to, a device adapted to act as a cathode.

The primary object of our invention, generally considered, is to conveniently and efficiently apply and secure a coil of wire on an article, such as a hollow cylinder of nickel or the like, such operation being effected at a desired time, such as prior and/or subsequent to the application of an electron-emission coating thereon, as in order to increase the effective electron emitting area and/or improve the coating adherence.

Another object of our invention is to wind wire by hand on a sleeve, which may eventually function as an electron-emitting cathode, while controlling the welding of the ends of said wire thereto by means of a pedal.

A further object of our invention is to provide a holder for a cathode sleeve which may be turned and simultaneously moved longitudinally to a limited extent in either direction, while the end of a wire to be wound thereon is held by one of clamps disposed one at each end of said sleeve, whereby said wire may be wound beginning at either end of said sleeve.

A still further object of our invention is to provide a wire winding and welding device in which the spool from which the wire is fed is held by a tensioning device and the wire passes therefrom through a friction clutch, whereby it is kept from tangling in case of breakage.

An additional object of our invention is to provide a hand winding machine for wire which is adapted for winding in either direction and provided with a limit stop at both ends to prevent overrunning.

Another object of the invention is to provide a wire winding and welding device, making use of a head which carries the parts and a cam under the control of a pedal which drops said head into engagement with a bottom electrode at the proper time, for effecting the welding operation.

A further object of our invention is to provide a method of applying a coil of wire to a sleeve adapted to function as an oxide-coated cathode for a discharge device, involving the welding of one end of the wire to the sleeve, rotating said sleeve while simultaneously moving it endwise while the wire is fed thereto from a stationary position, and finally welding the other end of said wire to said sleeve.

Other objects and advantages of the invention, relating to the particular arrangement and construction of the various parts, will become apparent as the description proceeds.

Referring to the scale drawing:

Fig. 1 is a side elevational view of wire-winding and welding apparatus involving our invention.

Fig. 2 is an elevational view of the winding aparatus detached from the welding apparatus, but showing the welding electrodes.

Fig. 3 is a horizontal sectional view on the line III—III of Fig. 2, in the direction of the arrows.

Fig. 4 is a fragmentary vertical sectional view on an enlarged scale on the line IV—IV of Fig. 3, in the direction of the arrows.

Fig. 5 is a fragmentary sectional view on the line V—V of Fig. 4, in the direction of the arrows.

Fig. 6 is a sectional view of a wire-wound hollow cylindrical element.

Referring to the drawing in detail, like parts being designated by like reference characters, there is shown welding apparatus in Fig. 1 which may correspond with that described and claimed in the Holloway Patent No. 2,330,055, dated September 21, 1943. In other words, the table or other support 11 may correspond with that of the same number in said patent, the bracket 12 may agree with that similarly numbered in the patent, and corresponding comments apply to the shaft 14, the arm 15, the movable electrode 16, the set screw 17, the flexible cable 18, the transformer 21, the fixed electrode 22, the socket member 23, the set screw 24, the bell crank lever 26, the arm 27, the spring 28, the forwardly extending arm 29, the lug 31, the shoulder 32, the coil spring 33, the depending arm 34, and the operating pedal 35. Other parts may be compared in a similar manner, as will be understood by those skilled in the art.

In the present instance, the "work," which in the patent is designated by the reference character 25, is desirably, but not necessarily, a sleeve or hollow cylinder 36 which may be of nickel or other suitable material which is to be coated with electron emission material, either prior, subsequent, or at both times with respect to the application of a coil 37 of wire therearound. Such a coil performs two functions, first, the increasing of the electron emitting area, and second, the more secure bonding of the electron-emission material to the sleeve. Although we have illustrated a sleeve for use as a cathode adapted to be heated to electron-emitting temperature by an internal coil, other uses for winding wire will occur to those skilled in the art.

A preferred embodiment of the winding device of our invention involves a base member 38, which may be in the form of a casting, and which is desirably secured to the table or other support 11 in any desired manner. This base carries a standard 39, apertured near its upper end as indicated at 41 to receive a pivot pin 42 securing a head drop arm member 43 thereto. The member 43 is supported by a bell crank device 100 pivoted at 40 to the base member 38 and carrying a box cam device 60 slidable on a pin 70' carried by depending portions of said member 43 for lowering it when the device 100 is swung counter-clockwise, as by depressing the operating pedal 35. The member 43, in turn, is apertured near its free end, as indicated at 44, and journaled in said aperture is a driving-pinion sleeve 45, that is, preferably a sleeve 46 the outer end of which is formed as a pinion 47, although it will be understood that the pinion may be separately formed and secured to the sleeve, if desired. A handle 102 may serve for turning the member 45, one way or the other. Meshing with the pinion 47 is a driven gear 48 secured to a shaft 49 as by means of a set screw 51, which shaft is journaled in the drop head arm 43, as indicated most clearly in Fig. 3.

The driving pinion sleeve has an axial pocket 52 which communicates with longitudinally extended radial slots 53 and 54, said pocket receiving the stem portion 55 of a cathode sleeve holder 56, and the slots 53 and 54 respectively receiving opposite ends of a pin 57 fixed in, and which limits the longitudinal movement of, said sleeve holder 56 with respect to said driving pinion sleeve 45, while insuring that turning movement of the driving pinion sleeve is communicated to said sleeve holder. The cathode sleeve holder 56 in turn carries a cathode sleeve shaft 58 either formed integrally therewith or connected thereto as by means of a set screw (not shown), which shaft is threaded at its outer end, as indicated at 59, in order to carry the cathode sleeve nut 61 which serves to clamp the cathode sleeve 36 between its conical face 62 and a corresponding face 63 on the outer end portion of the cathode sleeve holder 56.

The cathode sleeve holder 56 and the nut 61 respectively carry wire holder pins 64 and 65 (Figs. 2, 3 and 4) which are slidably mounted in corresponding projections 66 and 67. Each pin is apertured, as at 50, at the end remote from its head to receive a wire. They carry springs 68 and 69, respectively, so that when the heads are pushed against the action of the springs the holes 50 are uncovered, permitting insertion of wire thereinto, which wire is gripped by the spring return action upon release of the heads, in order to start the winding operation. Each pin 64 and 65 desirably has its shank slotted, as indicated at 60, and receives a retaining screw 70, thereby preventing undesired removal while permitting the necessary pin movement.

The shaft 49 is provided with an internal thread 71 engaged by an external thread 72 on a feed screw 73, which carries at its outer end a fork 74 secured thereto in any desired manner, as by means of a pin 75. The fork 74 straddles the cathode sleeve holder 55 between shoulder or flange portions 76 and 77 thereon, in order to effect the desired longitudinal or axial movement of said holder during the winding operation.

The folk 74 is desirably apertured, as indicated at 78, and receives a threaded stud 79 extending from the head drop arm 43, to which it is secured in any desired manner as by means of a pin 81. On the stud 79 are pairs of nuts 82, 83, 84 and 85 which may be locked together in adjusted position, as indicated, in order to predetermine the limits of movement of the fork 74 and thereby the corresponding limits of movement of the cathode sleeve 36 carried by the machine.

The wire 99 used for winding sleeves such as 36 or other desired articles, may be formed of nickel, molybdenum or other suitable metal and is in the present embodiment carried on a spool 86 mounted on a shaft 87 which is provided with a brake sheave or drum 88 around which a cord or braking element 89 passes. The element 89 is urged resiliently against the drum by means of a coil spring 91 acting between a pin 92 and a frictionally-held adjustable tension pin 93, whereby said wire may be drawn from the spool as desired under predetermined tension.

After passing off the spool, the wire goes through a wire guide sleeve 94 held in a support rod 80 secured to a lug 90 on the arm member 43. The sleeve carries a finger-controllable pivotally-mounted spring-actuated latch 95, between which and a friction portion 96 of sleeve 94, the wire passes to the discharge end 97, which may involve a hardened insert 98, from whence it is desirably wound around the sleeve 36 once and then fitted in the wire receiving aperture 50 of one of the holding pins, 64 or 65 depending from which end of the sleeve the winding is to be started. Release of the pin causes its spring to effect gripping of the wire 99.

Before starting the wire-winding operation, the pedal 35 is moved from the full to the dotted line position shown in Fig. 1, pulling the lever 100 against the action of the spring 101 from its full to dotted line position, thereby dropping the sleeve 36 carried by the arm 43 onto the fixed electrode 22. Further movement of the pedal 35 causes the movable electrode 16 to engage the wire 99 and weld it to the sleeve 36. After this has been accomplished, the pedal 35 is released to return to its full line position under the action of springs 28 and 101, and the handle 102 on the sleeve 46 is turned to cause winding of the wire 99 on the sleeve 36 for the full length allowed between the stop nut 83 on the one hand and 84 on the other.

At the end of the winding operation the wire is welded to the other end of the sleeve 36 by repeating the previously described movement of the pedal 35 from full to dotted line position. When this has been accomplished the spool end of the wire is cut loose from the sleeve 36, the nut 61 removed, and the wound sleeve removed therefrom to be replaced by another sleeve 36, and the winding operation repeated, this time from the other end and upon turning the handle 102 in the opposite direction.

From the foregoing disclosure it will be seen that we have provided a wire-winding and welding device which may be used to wind sleeves adapted to act as electron emitting cathodes in discharge devices, as well as any other articles which it is desired to cover with wire. Time and trouble is saved by winding such articles alternately first from one end and then from the other, means being provided to automatically drop the article to be wound upon the fixed welding electrode and then bringing the movable electrode into welding engagement with the wire at the top of the sleeve or other article. The machine also involves means for insuring that the proper length is wound and the number of turns per inch of the winding is determined by the ratio between the driving pinion and the driven gear which are subject to adjustment or substitution.

Although a preferred embodiment of our invention has been disclosed, it will be understood that modifications may be made within the spirit and scope of the appended claims.

We claim:

1. In a winding device, a pivoted sleeve, a driving pinion carried thereby, a pivoted driven gear shaft, a driven gear carried by said shaft and meshing with said pinion, a windable article holder turnably carried by said sleeve and having limited longitudinal movement with respect thereto, a feed screw carried by said driven gear shaft, means carried by said screw for moving said holder longitudinally during winding, means mounted at each end of said holder for clamping an end of a wire at the beginning of the wire-winding operation, and means on said sleeve for turning said holder to wind said wire on any article carried thereby.

2. In a winding device, a base, a sleeve pivoted with respect thereto, a driving pinion carried by said sleeve, a driven gear shaft pivoted with respect to said base, a driven gear carried by said shaft and meshing with said pinion, a windable article holder carried by said sleeve and having limited longitudinal movement with respect thereto, a feed screw carried by said driven gear shaft, means carried by said screw for moving said holder longitudinally during winding, a wire holder pin mounted at each end of said holder for clamping an end of a wire at the beginning of the wire-winding operation, and means on said sleeve for turning said holder to wind said wire on any article carried thereby.

3. In a winding device, a base, a sleeve pivoted with respect thereto, a driving pinion carried by said sleeve, a driven gear shaft pivoted with respect to said base, a driven gear carried by said shaft and meshing with said pinion, a windable article holder carried by said sleeve and having limited longitudinal movement with respect thereto, a feed screw carried by said driven gear shaft, means carried by said screw for moving said holder longitudinally during winding, means for securing a wire to said holder before beginning the winding operation, a support rod, a wire-guide sleeve carried by said rod, a friction element, a wire guide latch pivoted to said rod and resiliently urged toward said friction element for holding wire being fed thereagainst, a spool holder shaft mounted on said base, a spool of wire carried thereby, a brake element carried by said spool, means for applying adjustable pressure on said brake element to vary the tension on the wire drawn from said spool, and means for turning said holder to wind said wire on any article carried thereby under tension in accordance with the adjustment of said latch and spool braking means.

4. In a winding device, a base, a sleeve pivoted with respect thereto, a driving pinion carried by said sleeve, a driven gear shaft pivoted with respect to said base, a driven gear carried by said shaft and meshing with said pinion, a windable article holder movably carried by said sleeve, a feed screw carried by said driven gear shaft, a fork carried by said screw and straddling a portion of said holder for moving the latter longitudinally during winding, a stud passing through an aperture in said fork, adjusting nuts disposed on said stud at opposite sides of said fork for predetermining the extreme limits of movement of the latter, and a handle on said sleeve for turning said holder to wind said wire on any article carried thereby between the limits allowed by said nuts.

5. In a winding device, a base, a sleeve pivoted with respect thereto, a driving pinion carried by said sleeve, a driven gear shaft pivoted with respect to said base, a driven gear carried by said shaft and meshing with said pinion, a windable article holder carried by said sleeve and having limited longitudinal movement with respect thereto, a feed screw carried by said driven gear shaft, and means for effecting movement of said holder longitudinally simultaneously with rotary movement comprising a fork carried by said feed screw and straddling a portion of said holder.

6. In a device for forming wire-wound articles, a pivoted head drop arm, a cam for lowering and raising said arm, a sleeve pivoted in said arm, a driving pinion carried thereby, a driven gear shaft pivoted in said arm, a driven gear carried thereby and meshing with said pinion, a windable article holder turnably carried by said sleeve and having limited longitudinal movement with respect thereto, a fixed welding electrode disposed below said holder, a movable welding electrode disposed above said holder, a feed screw carried by said driven gear shaft, means carried by said screw for moving said holder longitudinally during winding, means from which wire is feedable to be wound on means carried by said holder, means on said sleeve for turning said holder to wind said wire on an article carried thereby, and a pedal connected to said cam and movable electrode for dropping a windable article carried by said holder upon said fixed electrode and said movable electrode upon said article to weld wire thereto.

7. In a device for forming wire-wound articles, a base, a head drop arm pivoted thereto, a cam for lowering and raising said arm, a sleeve pivoted in said arm, a driving pinion carried thereby, a driven gear shaft pivoted in said arm, a driven gear carried thereby and meshing with said pinion, a windable article holder carried by said sleeve and having limited longitudinal movement with respect thereto, a fixed welding electrode disposed below said holder, a movable welding electrode disposed above said holder, a feed screw carried by said driven gear shaft, means carried by said screw for moving said holder longitudinally during winding, means from which wire is feedable to be wound on means carried by said holder, means on said sleeve for turning said holder to wind said wire on an article carried thereby, and a pedal connected to said cam and movable electrode for first dropping a windable article carried by said holder upon said fixed electrode and then dropping said movable electrode upon said article to weld wire thereto at either end, depending on the position thereof as determined by the longitudinal movement of said holder.

8. In a device for forming wire-wound articles, a base, a head drop arm pivoted thereto, means for lowering and raising said arm, a sleeve pivoted in said arm, a driving pinion carried thereby, a driven gear shaft pivoted in said arm, a driven gear carried thereby and meshing with said pinion, a windable article holder carried by said sleeve and having limited longitudinal movement with respect thereto, a fixed welding electrode disposed below said holder, a movable welding electrode disposed above said holder, a feed screw carried by said driven gear shaft, means carried by said screw for moving said holder longitudinally during winding, a handle on said sleeve for turning said holder to wind said wire on an article carried thereby, and a pedal connected to said lowering and raising means and movable electrode for first dropping a windable article carried by said holder upon said fixed electrode and then dropping said movable electrode upon said article to weld wire thereto.

9. In a device for forming wire-wound articles, a base, a head drop arm pivoted thereto, a cam for lowering and raising said arm, a sleeve pivoted in said arm, a driving pinion carried thereby, a driven gear shaft pivoted in said arm, a driven gear carried thereby and meshing with said pinion, a windable article holder carried by said sleeve and having limited longitudinal movement with respect thereto, a fixed welding electrode disposed below said holder, a movable welding electrode disposed above said holder, a feed screw carried by said driven gear shaft, a fork carried by said screw and straddling a portion of said holder for moving the latter longitudinally during winding, wire holder pins mounted on said holder, a support rod extending from said base, a wire guide carried thereby, a spool holder shaft mounted on said base, a spool of wire carried thereby and from which wire is feedable, a handle on said sleeve for turning said holder to wind said wire on an article carried thereby, and a pedal connected to said cam and movable electrode for first dropping a windable article carried by said holder upon said fixed electrode and then dropping said movable electrode upon said article to weld wire thereto.

10. In a device for forming wire-wound articles, a holder for one of said articles, means turnably mounting said holder and allowing for limited longitudinal movement thereof, a shaft, a feed screw threaded thereinto, means for driving said shaft from said holder-mounting means in order to operate said screw, means carried by said screw for moving said holder longitudinally during winding, means mounted at each end of said holder for clamping an end of a wire at the beginning of a wire-winding operation, and means for turning said holder to wind said wire on a carried article.

11. In a device for forming wire-wound articles, an article holder, means mounting said holder for limited longitudinal movement, a feed screw, threaded means carrying said screw and driven from said holder-mounting means in order to cause said screw to move longitudinally, means carried by said screw for moving said holder longitudinally during winding, means for securing a wire to said holder before beginning the winding operation, a support rod disposed adjacent said holder, a wire guide sleeve carried by said rod, a friction element, a wire guide latch pivoted to said rod and resiliently urged toward said friction element, a spool holder shaft, a spool of wire carried thereby, means for varying the tension on wire drawn through said sleeve from said spool, and means for turning said holder to wind wire from said spool on an article carried by said holder.

12. In a device for forming wire-wound articles, a windable article holder, means for movably carrying said holder, a feed screw, means driving said screw from said holder-carrying means, a fork carried by said screw and straddling a portion of said holder, a stud for guiding said fork, adjusting means on said stud at opposite sides of said fork, and a handle for turning said holder to wind wire on an article carried thereby.

13. In a device for forming wire-wound articles, longitudinally movable means for supporting an article during winding, turning means slidably carrying said supporting means, means for feeding wire from a fixed position to said supported article, means for fastening said wire to one end portion of said article, drive means between said turning and supporting means, so that when the turning means is operated, said article also moves longitudinally a predetermined distance with respect thereto, and means for fastening the other end of said wound wire to said article.

14. In a device for forming wire-wound articles, longitudinally movable means for supporting an article during winding, turning means slidably carrying said supporting means, means for feeding wire from a fixed position to one end portion of said supported article, means for welding an end of said wire to one end of said article, drive means between said turning and supporting means, so that when the turning means is operated, said article also moves longitudinally a predetermined distance with respect thereto, and means for welding the other end of said wound wire to said article.

15. In a device for forming wire-wound articles, a pivoted head drop arm, means for raising and lowering said arm, a sleeve pivoted in said arm, a windable holder turnably carried by said sleeve and having limited longitudinal movement with respect thereto, a fixed welding electrode disposed below said holder, a movable welding electrode disposed above said holder, a feed screw for moving said holder longitudinally during winding, means for feeding wire to said holder, means for turning said holder to wind said wire on an article carried thereby, and means connected to said movable electrode for dropping a holder-carried article upon said fixed electrode, and said movable electrode upon said article, to weld wire thereto.

FREDERICK T. MAY.
RICHARD A. REHBERG.

REFERENCES CITED

The following references are of record in the file of this patent:

UNITED STATES PATENTS

| Number | Name | Date |
| --- | --- | --- |
| 1,305,690 | Coyer | June 3, 1919 |
| 1,323,621 | Edwards | Dec. 2, 1919 |
| 1,376,657 | Thronsen | May 3, 1921 |
| 1,863,850 | Holloway | June 21, 1932 |
| 1,878,558 | Walker | Sept. 20, 1932 |
| 1,933,971 | Dalheimer | Nov. 7, 1933 |
| 2,067,664 | Henry | Jan. 12, 1937 |